US012673551B2

(12) United States Patent (10) Patent No.: US 12,673,551 B2
Stop et al. (45) Date of Patent: Jul. 7, 2026

(54) ADAPTIVE VEHICLE CONTROL RESPONSIVE TO CHANGING DRIVING BEHAVIORS

(71) Applicant: FORD GLOBAL TECHNOLOGIES, LLC, Dearborn, MI (US)

(72) Inventors: Brian Wallace Stop, Canton, MI (US); Adil Nizam Siddiqui, Farmington Hills, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 497 days.

(21) Appl. No.: 18/078,766

(22) Filed: Dec. 9, 2022

(65) Prior Publication Data

US 2024/0190246 A1 Jun. 13, 2024

(51) Int. Cl.
B60K 35/10 (2024.01)
B60W 40/09 (2012.01)

(52) U.S. Cl.
CPC ............. B60K 35/10 (2024.01); B60W 40/09 (2013.01); B60K 2360/11 (2024.01); B60K 2360/122 (2024.01); B60W 2556/10 (2020.02)

(58) Field of Classification Search
CPC .... B60K 35/00; B60K 35/10; B60K 2360/11; B60K 2360/122; B60W 40/09; B60W 2556/10; B60W 50/00; B60W 2050/0005
See application file for complete search history.

(56) References Cited

U.S. PATENT DOCUMENTS

| | | | |
|---|---|---|---|
| 7,639,148 B2 | 12/2009 | Victor | |
| 9,648,107 B1 | 5/2017 | Penilla et al. | |
| 10,857,886 B2 | 12/2020 | Recktenwald et al. | |
| 2011/0082620 A1* | 4/2011 | Small | B60K 35/22 701/31.4 |
| 2015/0314791 A1* | 11/2015 | Prakah-Asante | B60W 50/14 701/36 |
| 2018/0208207 A1 | 7/2018 | Osotio et al. | |
| 2018/0222493 A1* | 8/2018 | Singh | B60W 50/14 |
| 2019/0163466 A1* | 5/2019 | Kiyama | H04W 4/44 |
| 2023/0196855 A1* | 6/2023 | Bernico | G06N 5/01 701/33.4 |
| 2024/0059149 A1* | 2/2024 | Goenawan | G06F 11/3438 |

FOREIGN PATENT DOCUMENTS

WO 2014197730 A1 12/2014

* cited by examiner

*Primary Examiner* — Navid Z. Mehdizadeh
*Assistant Examiner* — Caitlin R Mccleary
(74) *Attorney, Agent, or Firm* — Christopher Storms; Brooks Kushman P.C.

(57) ABSTRACT

A system detects the occurrence of a vehicle event designated as a trigger. The system obtains interaction data, representing user interface interactions with a user interface of a vehicle, recorded by the vehicle for a predefined time period leading to the event. Further, the system, for any obtained interaction data, compares the data to historical data indicating interactions with a user interface prior to previous events comparable to the detected event to determine whether there is at least one correlation between user interface interaction and the occurrence of events comparable to the detected event and, responsive to a determined correlation, instructs modification of an aspect of the user interface of the vehicle, the aspect associated with interactions represented by the interaction data.

8 Claims, 3 Drawing Sheets

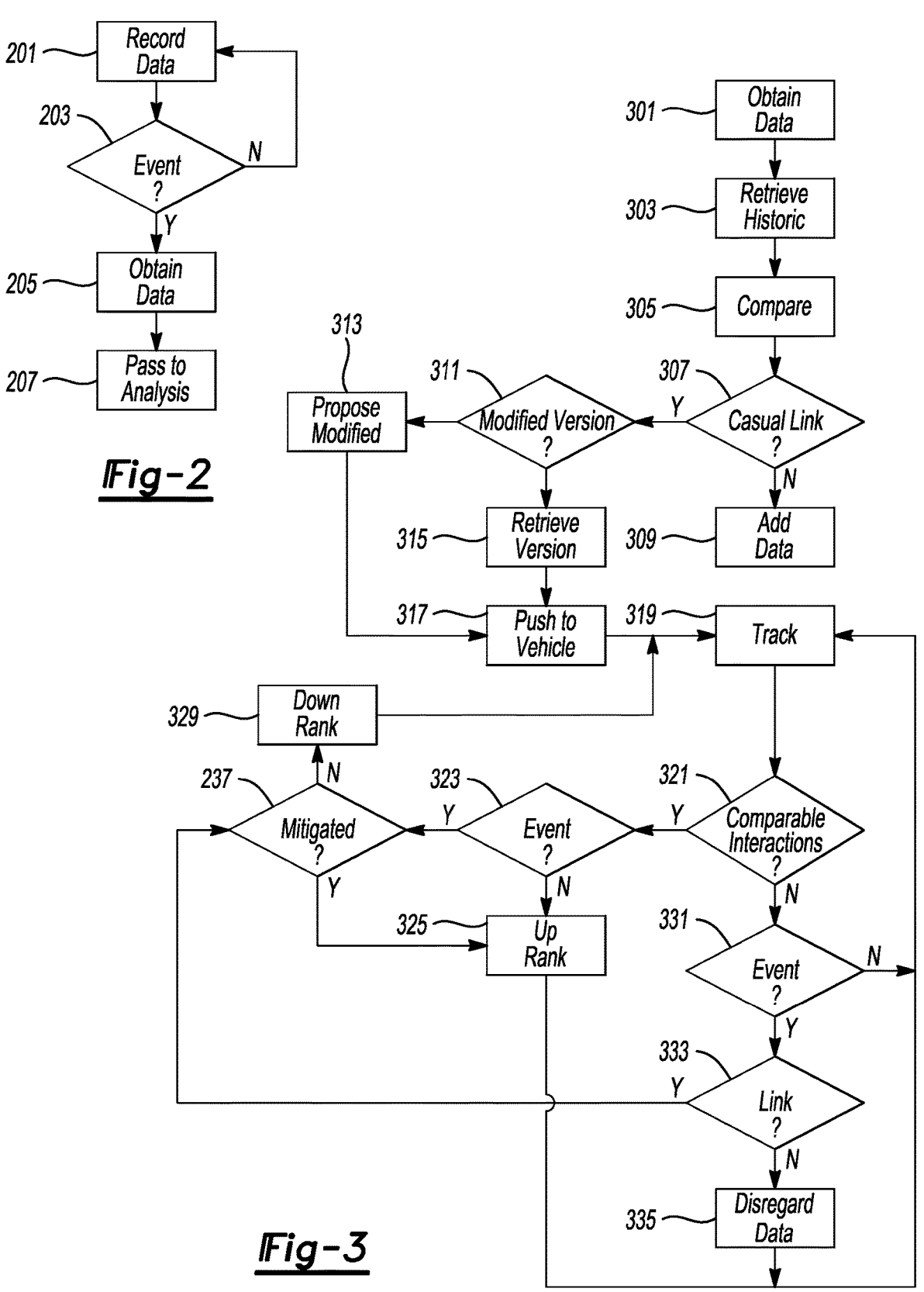
_Fig-2_
_Fig-3_

ADAPTIVE VEHICLE CONTROL RESPONSIVE TO CHANGING DRIVING BEHAVIORS

TECHNICAL FIELD

The illustrative embodiments generally related to adaptive vehicle controls that can change responsive to changing driving behaviors.

BACKGROUND

Many vehicles have made a significant shift from "hard" controls, which include physical buttons and switches, to "soft" controls, which include digital inputs and controls. The soft controls are typically presented on an in-vehicle display, and can provide control of virtually any vehicle system, including those with hard control counterparts. This is an efficient and effective way of controlling vehicles, but unless a driver knows the placement of controls precisely, it may often require a driver to look, even momentarily, at the display prior to interaction with a soft control. This can be contrasted with hard controls, which often have physically discernable profiles, so that a driver may eventually grow accustomed to reaching and feeling for certain controls without having to visually hunt for them. Of course, this cuts both ways, a driver in a new vehicle may have to spend a significant amount of time visually searching for an unfamiliar control location, whereas a digital control can always be made to appear at the same convenient and accessible location.

As the transition to digital based controls continues, focus is maintained on striking a balance between all the controls a driver needs at any moment and overly crowding a control menu with extraneous (for any given moment) controls. This focus matters as screen size increases as well, because there may be a temptation to increase the amount of alternative information on an increased screen. At the same time, different people have very different levels of comfortability with digital controls, making it sometimes difficult to devise a one-size-fits-all control solution that works best for everyone.

A major distinction between soft and hard controls is that soft controls do not have to be static in placement, sizing or nature—as modifications to a display strategy develop, soft controls can be immediately changed if desired. This is in contrast to hard controls, which would require a factory revision to change—i.e., one cannot simply make a radio button larger or move an HVAC control, without significant effort and modification of the vehicle. Because of this characteristic difference, soft controls are suitable for modification and amendment, but knowing when or how to amend these control presentations carries the same difficulty as noted above—that it is somewhat difficult to devise a control solution that is optimized for all users as a group.

SUMMARY

FIG. 1 shows an illustrative example of a vehicle and cloud control strategy deployment and tracking system;

FIG. 2 shows an illustrative feedback process;

FIG. 3 shows an illustrative modification evaluation process;

FIG. 4 shows an illustrative modification deployment process; and

FIG. 5 shows an illustrative modification application process.

BRIEF DESCRIPTION OF THE DRAWINGS

In a first illustrative embodiment, a system includes one or more processors configured to detect the occurrence of a vehicle event designated as a trigger. The one or more processors are also configured to obtain interaction data, representing user interface interactions with a user interface of a vehicle, recorded by the vehicle for a predefined time period leading to the event. Further, the one or more processors are configured to, for any obtained interaction data, compare the data to historical data indicating interactions with a user interface prior to previous events comparable to the detected event to determine whether there is at least one correlation between user interface interaction and the occurrence of events comparable to the detected event and, responsive to a determined correlation, instructing modification of an aspect of the user interface of the vehicle, the aspect associated with interactions represented by the interaction data.

In a second illustrative embodiment, a system includes one or more processors configured to detect the occurrence of a vehicle event designated as a trigger and obtain interaction data, representing user interface interactions with a user interface of a vehicle, recorded by the vehicle for a predefined time period leading to the event. The one or more processors are further configured to, for any obtained interaction data, compare the data to historical data indicating interactions with a user interface prior to previous events comparable to the detected event to determine whether there is at least one correlation between user interface interaction and the occurrence of events comparable to the detected event. Also, the one or more processors are configured to, responsive to a determined correlation, instruct modification of an aspect of the user interface of the vehicle, the aspect associated with interactions represented by the interaction data and, responsive to modification by the modification, track utilization of any aspects of the user interface modified by the modification and correlate the tracked utilization to any occurrence or non-occurrence of events comparable to the detected event, or track occurrence of events comparable to the detected event and determine to what degree any aspects of the user interface modified by the modification were utilized prior to the tracked occurrence.

Figure 1:
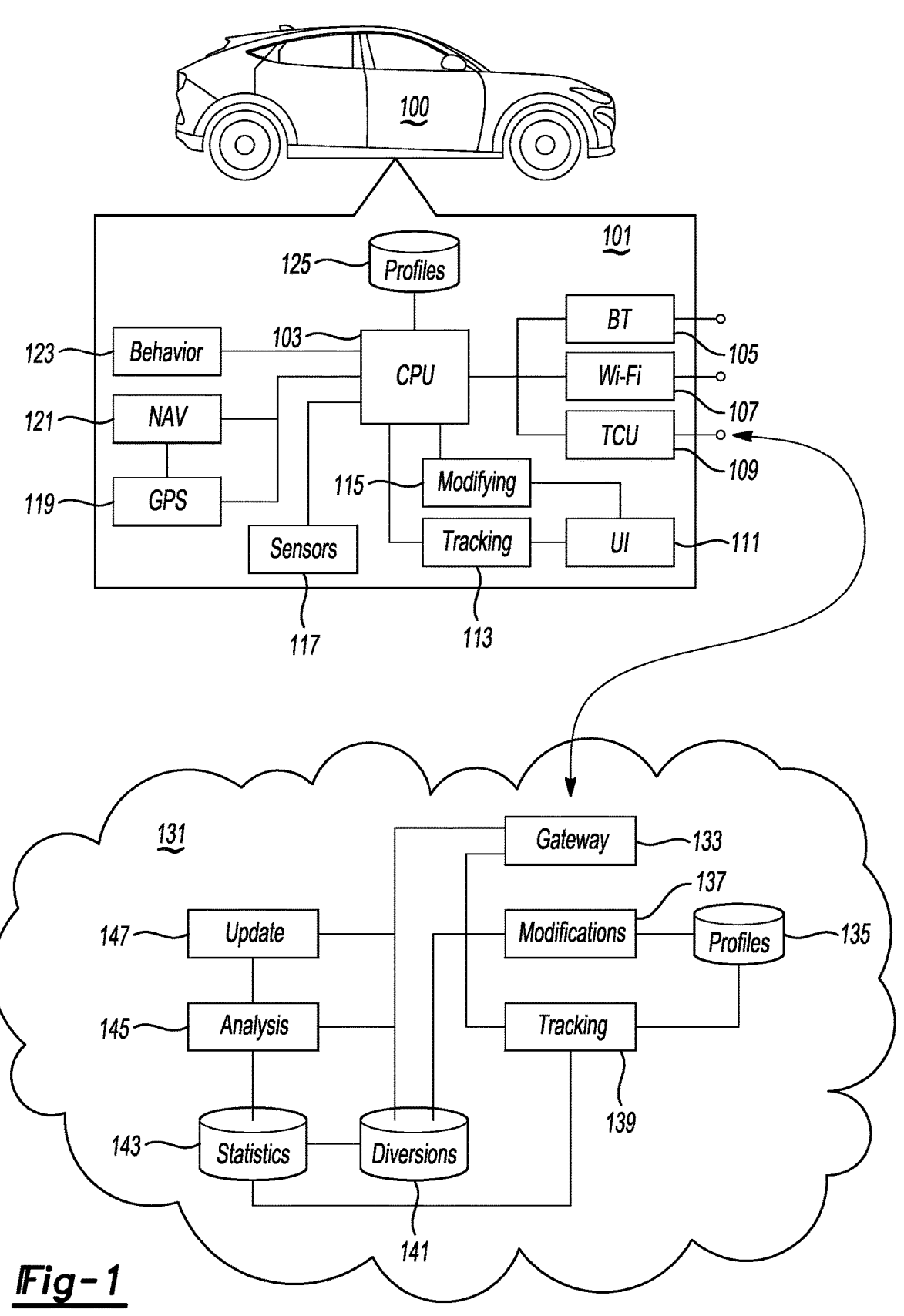

In a third illustrative embodiment, a system includes one or more processors configured to deploy a user interface change to a plurality of vehicles, responsive to each vehicle being identified as having experienced a threshold number of detected events having a defined linkage to user interface interaction based on respective user interface usage data from a respective vehicle preceding a respective detected event. The one or more processors are also configured to track interactions with a user interface modified by the change to determine whether the change produces positive outcomes with respect to new events comparable to the detected events and, responsive to the tracked interactions producing positive outcomes, identify a second group of candidate vehicles, experiencing events comparable to the detected events. Further, the one or more processors are configured to deploy the user interface change to the second group of vehicles.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose the creation of and use of control modification and distribution processes that allow for both dynamic modification of soft controls and leveraging feedback from vehicle sensors to determine which modified control strategies are effective. When cross referenced with various classes of users, who can be classified based on virtually any observed behavior, it may be possible to devise and test modified control strategies for various demographic groups and then push modifications to whole classes of users who may benefit from altered control sets and presentations. This can be done with regards to commercial fleets or even with regards to an entire customer base of users.

Moreover, when there is an impetus for control changes (e.g., there is a presumed reason that a control strategy change will address), feedback from individual applications of the control strategy can be used to determine whether any target goals are being achieved. This can both help refine demographic groups (e.g., the targets are achieved, but only for a subset of a proposed demographic having certain characteristic behavior) and can help determine the general effectiveness of both a specific change and a concept underlying the change. That information can, in turn, lead to even more effective changes, allowing control strategies and presentation strategies to be adopted at scale and change to address the modifications that appear to have the most success at achieving any particularly desired goals.

One thought for developers when working on a user interface (UI) for soft vehicle controls is how much information to present that provides a useful user experience without being overwhelming or difficult to negotiate. The solution to such a problem, however, often varies with different users. Some users use interactions much more frequently than others, and some users have a better intuitive sense of the interactions than others. Other users may simply have a mindset similar to a developer's, making a deployed display solution easier because of a common mindset. Some users require larger text, and many users find larger text easier to interact with, but this also limits the amount of options available on a single screen, requiring additional scrolling for certain features.

Even with surveys, testing and polling, it can be difficult to come to an eventual decision about a display, and even the eventual solution may not be the most preferable option for every user. The illustrative embodiments allow for tracking of vehicle events, such as hard braking or steering corrections, which may indicate that the user was focused elsewhere, at least momentarily. Since the vehicle can also track UI interaction, it can be determined if the UI was the focus preceding the event, which may lead to a conclusion that that particular user could benefit from an alternative UI, especially if the UI was often in focus prior to an event. This presents an opportunity to deploy a modified UI, and if other user characteristics are known (preferential interactions, speed of interactions, etc.) then it may be possible to deploy a UI that has proven effective for comparable users.

Such feedback also makes it possible to test and determine the effectiveness of both a UI and UI strategies, so that options that work best in the field can be tested and determined, prior to use for mass rollout. Users may agree to participate in alternative UI approaches and the success of these approaches can be used as the basis for advanced UI rollout. For example, it may be that for some demographics, fewer and larger icons are more useful. In other instances, it may be determined that placing certain common objects in large-form (e.g., radio station preset buttons for users who largely use presets) results in faster selection.

It can also be observed whether a change has no noticeable effect on a user's performance, so that the change can be discarded or rolled-back if the user desires. Even these observations can help identify what areas are potentially less important when developing UI changes.

FIG. 1 shows an illustrative example of a vehicle and cloud control strategy deployment and tracking system. In this example, the vehicle 100 includes an onboard computing system 101. This includes one or more processors 103, as well as a variety of communication mediums. In this example, the mediums include BLUETOOTH 105, Wi-Fi 107 and a telematics control unit 109. The telematics control unit (TCU) can provide longer range cellular connections which can be used, among other things, for providing feedback on UI operation determinations as well as provide the vehicle with useful UI updates that may be useful for one or more vehicle drivers.

The vehicle also includes at least one display 111 presenting a user interface (UI) that can be modified based on user modifications and/or remote updates. Users may also be able to expressly modify UI characteristics, such as icon size, font size, icon order, etc., but many may elect not to do so either from a lack of knowledge that this can be done, or a lack of understanding as to how to modify the UI. Nonetheless, user modifications may also be a source of potential changes to a broader UI deployment, if certain user changes result in better user behavior preceding events and/or a decrease in overall event detection.

For example, a user could choose to have a UI button change color under certain situations, making a single or group of icons stand-out from the larger group. Stylization could be changed, as well as adding effects to a button, such as having it flash. Users may dictate various methodologies that create changes in display. Further, user preferences may define, for example, "orange" or "flashing" as a designator for important icons, and then a general deployment strategy that is crowd-tested may involve, for example, "increasing the visibility of N icons under situation X." This allows for an effective strategy (in this example, it has been proven effective by presumed testing), without strict adherence to universal guidance in terms of changes—that is, the user can dictate what "increased visibility" means to them and the vehicle can adapt the general strategy of increased visibility to that user's preferences.

A modifications process 115 can implement server-based and/or onboard UI changes and apply various UI decisions based on, for example, driving conditions and/or who is driving a vehicle. It may be possible to have varied UI modifications based on an observed driver, for example, detectable through facial recognition, device recognition (e.g., a phone signature), which key is used, vehicle element and mirror positions, etc. That is, driver A and driver B may have very different baseline UIs presented when they are driving, depending on what is determined to work best for each of them.

Situational UI changes may also occur in heavy weather, heavy traffic, etc., reducing the total number of icons and/or increasing font sizes. Artificial intelligence processing may also help automate some number of UI decisions if enabled, such as automatically selecting common HVAC and radio settings when a user reaches certain points with a common context where the user has been observed to make certain changes—e.g., if a user rolls windows down, the user usually turns down a blower speed and increases radio volume.

A tracking process 113 can determine what occurs just prior to any detected events, what general UI interactions occur, duration and nature of interactions and whether many interactions lead to the non-detection of events. That is, if a user is often interacting with a UI prior to hard braking or steering adjustment, that user may benefit from a modified UI. On the other hand, if there is no braking or adjustment detected following 98% of UI interactions, it may be assumed that an observed UI interaction leading to an event was an anomalous occurrence, and that user may have a suitable UI already present that fits their situation.

Vehicle sensors 117 may determine events that occur, as well as observe driving characteristics of users during UI interactions as opposed to at other times during a drive. Events can be dynamically defined, and may include some baseline events (e.g., hard braking) as well as some events that may or may not be an actual event for a given user. For example, some users may follow closely regardless of whether they are using a UI, so detecting close following is not necessarily an impetus for changing a UI, when it is determined that following closely is baseline behavior for a given user. The same could be true of hard braking or any other event originally designated as a possible motivation for changing a UI to keep driver focus on the road.

Navigation systems 121 and GPS 119 can be used to provide routes and track behavior that may motivate UI changes—such as when children are picked up or dropped off, which may change UI from a passenger-centric UI with features that support passengers to a driver-centric UI with features that directly support the driver. Onboard behavioral analysis 123 to determine patterns of usage and their correlation to detected events can be utilized to determine driver behavior, or that analysis can take place in the cloud, if desired. Driver profiles 125 may define relationships between certain users and corresponding UIs.

The cloud 131 may also support UI distribution and analysis from the backend, providing access to changed UIs based on crowdsourced observation of successful changes or strategies. A gateway process 133 can route requests to and responses from the cloud accordingly, and in this instance those can include modification analysis 137, which can determine whether a UI change may be suitable for a given driver based on observed behavior. Driver profiles and accompanying demographics (as relevant for UI deployment) and behaviors can be stored in profile database 135, and this data can be anonymized as needed, so as to correlate the data to a driver identified by a nonspecific identifier, such as correlating drivers to vehicles and assigning, for example, Driver A, Driver B, etc. to driver profiles, as opposed to personally identifying data.

A tracking process 139 can gather data related to the success of a deployed UI change based on feedback from the vehicle, usable by an analysis process 145 to determine if the UI is resulting in fewer events or material changes in the nature of events—such as hard braking for shorter periods, or less hard braking in general, following UI usage.

The cloud 131 may also store a library of various UI changes and versions 141, which can include demographic or behavior correlation—for example, a certain UI change may be designated as successful for people who spend more than 10 seconds at a time interacting with a radio application.

While humans are adaptive creatures by nature, it still may be a bit confusing if a vehicle UI is constantly changing, so certain changes may only be pushed to users who may benefit from those changes, as opposed to changing all UIs in an entire fleet of vehicles every time a certain change proves to be an effective one. Other users may willingly accept such changes and may configure their profiles to accept any proposed UI changes that may result in positive results for their driving performance. Any and all changes to UIs may also be subject to user acquiescence prior to implementation.

The cloud may also store positive statistical change 143 observed correlated to UI changes, both generally and with regards to certain groups of users, so that the cloud can determine when it is appropriate to push a UI change. For example, it may be the case that a UI change is not pushed unless at least one of either a month has passed since a prior change or the statistics represent a decrease in incident observance over N % (e.g., time-restricted or change-based enactment). This may be done to diminish any potential confusion for users that could occur from continual changes and which may offset some of the effectiveness of those changes. Again, however, any given user may be able to override this and opt-in to all UI changes.

An update process 147 may determine when UI changes have proven effective enough to warrant updating a whole fleet or subset of a fleet. This process may continually push changes to opting-in users, and may also push fleet or group-wide changes to users when certain trigger parameters, such as UI changes providing threshold increases in successful interactions, are met.

FIG. 2 shows an illustrative feedback process. In this example, a vehicle 100 gathers UI and sensor feedback data continually as a vehicle 100 travels at 201. This data may be queued in temporary memory space, and discarded when not needed.

If the vehicle 100 determines that the gathered data indicates the occurrence of an event, for example, without limitation, hard braking, falling below a speed limit excessively, swerving, aggressive steering correction, etc., essentially any potential anomalous behavior at 201, the process may obtain a record of data leading up to the event at 205 and pass this data to local or remote analysis at 207.

In one example, the data leading up to an event may indicate some level of UI interaction that preceded the event. This sort of data can be indicative of the UI keeping driver focus elsewhere, and if a common occurrence, may indicate an opportunity to change the UI experience to attempt to decrease the amount of driver interaction and thus decrease the occurrence of events.

In another example, the lack of UI interaction may also be relevant data preceding the event, as it may indicate that the event had no relationship to the UI, or, in other instances, that the event was not even an event for this driver, but rather simply that driver's style of driving. As a profile is built for each driver, it can become easier to identify what instances, if any, that particular driver would benefit from a modified UI, and/or what UI modifications may simply decrease the likelihood of an event occurring under any circumstances, for that driver.

FIG. 3 shows an illustrative modification evaluation process. In this example, the process observes an occurrence of an event, such as in FIG. 2, and passes the data to analysis process, that receives the data at 301. The process retrieves historical data for the driver (if such data exists) at 303, and compares the current data to historical data. As a non-limiting example, in this instance, the comparison can be used to draw several conclusions. For example, if the event was revealed, based on historical data, to simply be indicative of the general behavior of this driver, then the event and data may not be a good basis for UI improvement, since the event may be decoupled from UI usage.

Alternatively, if the data indicated a general occurrence of, or lack of, UI interaction prior to previous comparable events, this information could be used to determine if future events could be mitigated through a UI change or one or more aspects of the UI that commonly preceded such events for that driver. If there is no such causal link at 307, the process may simply add the data to a general data store for events at 309. This can help build the historical record for that driver, even if the data does not reveal an immediate causal linkage.

If there is an apparent causal link at 307, the process may determine whether a modified version of a UI or UI element exists that may provide a favorable outcome, at 311. This can include, for example, general UI changes to a commonly-used element indicated by the data to precede the event for that user, or specific types of changes that may benefit a certain demographic associated with the user based on other observed behavior. If such a version does not exist, the process can either wait until such a version is revealed based on group testing or, if the user is a willing test candidate, the process may deploy a proposed change at 313 and push the change to the vehicle at 317.

When the proposed modification version already exists at 311, the process may retrieve the change at 315 and also pass the change to the vehicle at 317. In either instance, the user may be informed of the proposed change and/or what is being changed by the change, and may be given the option to accept or decline the change. Typically, the change will be pushed and presented at a time when the user is not engaged in driving.

The process can then track the success of the change to the UI at 319 based on any observed changes in outcomes with regards to that driver's behavior. This can be a combination of data gathering and analysis, and may at least partially rely on data flagged for consideration with respect to the change. This flagged data can include, but is not limited to, interactions with aspects of the UI changed by the change and event occurrence similar to the event or events that were an impetus for the change.

It may be useful to identify the data of interest because if the change is highly successful, then the UI usage and events may decouple almost entirely. That is, any events may no longer be linked to UI usage, and any UI usage may no longer result in events, and so if the analysis is looking for instances of UI usage+events to determine success, it may find few or no such instances. But, the non-occurrence of UI usage+events is also telling as to the success of a change, and so it may be worth flagging and tracking either one without the other.

Accordingly, as part of illustrative tracking, the process may determine whether there were any usages comparable to those that lead to prior event detection at 321—i.e., did the user perform similar interactions as those that lead to an event.

If the user did perform such actions, the process may determine at 323 whether those interactions lead to a comparable event to that previously observed in conjunction with the interactions. If no such event occurs following comparable interaction, the process may up rank or up weight the change as being a successful change at 325.

If such an event did occur, but was mitigated in characteristics at 327, this may also result in up ranking of the change. A degree of up ranking can be relative to any observed success, so that "no event" may be more meritorious than "mitigated event." A mitigated event may be, for example, hard braking but with less force or for less time, driving closely but not as closely, etc. Continual mitigation may reveal the success of a change, demonstrating decreased interaction times and/or improved focus. If there is no continued observation of mitigation or non-events, then the process may continue to down rank or down weight a change until it eventually becomes evident that the change was unsuccessful. The weightings and modifications may be used in a driver-specific, demographic specific and overall manner, so that outcomes with regards to a change may vary across these groups, and to circumvent down or up ranking a change for one group that does not apply to another.

If there is a comparable event detected at 331, the process can determine, as above, whether there is a linkage to any sort of user interactions at 333. If there is no associated user interaction data preceding the event at 333, the process may disregard the data at 335, and/or store it as evidence of the event occurring without the user interaction. This may not warrant up ranking, since the non-occurrence of user interaction does not mean the UI change was successful, it just means the event occurred for some other reason.

If there was UI usage prior to the event at 333, the process may determine if the event was mitigated in characteristics as compared to previously observed events, as described above. Appropriate up or down ranking can then occur.

Figures 4, 5:
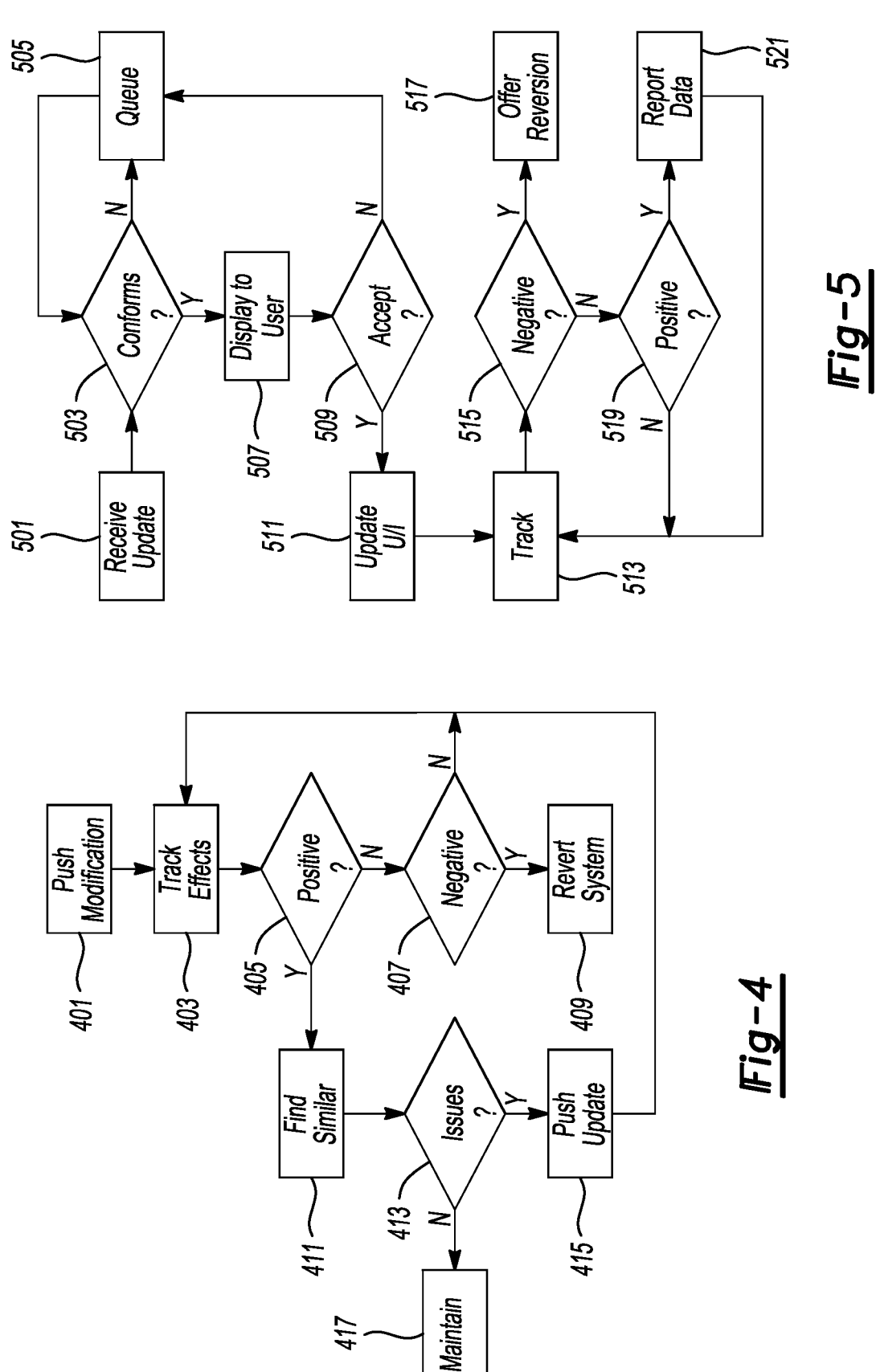

FIG. 4 shows an illustrative modification deployment process. In this example, a modification may be pushed to a vehicle for user adoption at 401. The effects of the modification on detected outcomes (e.g. events) may be tracked at 403, as well as any general effects, such as decreased user interaction times or increased user interactions times. Even if there is not a direct linkage between events and user interactions, a change that increases user interaction times may be eventually determined to be less successful than a prior state, with the opposite being true for a change that decreases user interaction times.

In this example, the modification may be delivered to a group of target volunteer vehicles representative of one or more demographics, or, in another example, to a sample group of vehicles within a fleet. This can allow for observation of any effects before going wider with a change, although these samples may not always be indicative of overall outcomes. Since tracking can also occur when the change goes wider, any deviation in the data revealing unexpected outcomes can be accommodated by, for example, reversion to prior UI modifications or base sets for some or all users.

If positive changes occur at 405, and in this instance the decision represents sufficiently observed positive changes to warrant mass or increased distribution, the process can find drivers or vehicles who are similar to the test set at 411. A change can be rolled out iteratively, to ever increasing groups, or highly successful changes may be rolled out on a larger scale more quickly. Apparent incorrect selections in button usage—e.g., pressing of a first radio button and then an immediate change to another, on a regular basis, may also be indicative that the system would benefit from a change, as the buttons may be too small for that particular user.

For any drivers within the identified group who are experiencing issues similar to those that were the impetus for the change at 413, the process may push the updated UI to those vehicles at 415. Other vehicles in the group may have their UI remain unmodified at this time at 417.

For example, a given UI may result in a positive change to 30% reduction in overall hard braking events and a mitigation of 50% of the aggression and duration of hard braking within a given group or demographic. Thus, anyone who is also in that group and who also experiences significant hard braking events following or during UI usage may be a candidate for this update. Other members of the group may not actually have hard braking events associated therewith, and whether the change is pushed to these people can be a matter of preference.

In another example, the positive change may be that people who interact with radio buttons do so 20 percent faster, which may be a change applicable to everyone who uses radio buttons with any frequency, since the positive change is event agnostic.

The tracking can also determine rate of adaptation based on observation—that is, how long it takes people to start acting faster, which may even include slower interactions at first while they adjust to the new changes to the UI. Slower rates of adaptation may reveal a complicated update or an update that needs to be rolled out gradually in phases, and rates of adaptation may also be used to determine whether or not a given change should be rolled out to drivers who may not otherwise need the change.

If sufficiently negative effect is determined at 407, such as increases in events, increases in duration of events, or increased interaction times, for example, the process may instruct reversion for one or more vehicles at 409. Reversion may be limited to the vehicles experiencing negative effects, if some vehicles experience positive effects and others experience negative effects. Observing both types of outcomes within a group may reveal an opportunity to modify a demographic or may become another factor that separates demographics.

FIG. 5 shows an illustrative modification application process. This is an example of a vehicle-side process that receives and applies a given change to a UI, along with onboard tracking or reporting of data as needed. In this example, the process receives an updated UI instruction at 501 and determines if the modification conforms to any applicable modification rules at 503.

For example, some rules may dictate modification of a UI every Nth time period, so as not to over-modify UIs. Other rules may dictate that only certain types of UIs be applied, based on user preferences, or that only certain types of changes with more than a threshold change in behavioral outcome be applied, to stop a constant string of minor changes.

In instances where the change can be applied later based on timing, the process may queue the change at 505 until the relevant time period passes. Then, assuming no better version of the UI modification is presented to the vehicle, the change can be implemented when the time period for change lapses. In other instances, the change may be disregarded based on user rules, such as when a minor change is insufficient to warrant modification, and the user will electively wait for a greater change in outcomes before applying a change. Additionally or alternatively, some users may elect to be notified every time there is a possible change, and want to electively determine each time whether a given change should be applied.

If the change conforms to any rules that may outright block the change at 503, the process can present the proposed update to the user at 507. This can include identification of functions to be changed, examples of changes, etc. The presentation can include a text or spoken description of the change, as well as demonstrative graphics showing before and after versions of a display or application following the change.

If the user declines the change at 509, the change can be queued upon request and/or discarded. If the user accepts the change at 509, the process can apply the change at a suitable time at 511 and engage tracking of behavior associated with the aspects of the UI affected by the change. In some instances, the user may be asked to walk through a sample interaction with the changed UI while a vehicle is parked, and/or to confirm that the sample interaction is acceptable, before the change goes live for driving conditions. Users may also be presented with a reversion button or option that can be used at any time to revert to an old UI—if possible, reversion may even occur while a vehicle is moving, if the user needs the application but also needs the old interface for some reason because the new interface is confusing and the user cannot afford the time to figure out the differences. Depending on the level of change and the acceptability of intra-drive modification of UIs, this live-reversion may or may not be possible for a given change.

As the user drives, the process, onboard or with the aid of the cloud, tracks and analyzes outcomes associated with UI interactions affected by the changed UI aspects. If the overall outcomes appear to be negative after some threshold number of observations at 515, and assuming the reversion option is not always-present, then the process may present an option to revert at 517. If the overall outcomes appear to be positive at 519, the process may simply report the positive data at 521, an outcome which may also occur with respect to negative observations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A system comprising:
one or more processors configured to:
deploy a user interface change to a plurality of vehicles, responsive to each vehicle being identified as having experienced a threshold number of detected events having a defined linkage to user interface interaction based on respective user interface usage data from a respective vehicle preceding a respective detected event;
track interactions with a user interface modified by the change to determine whether the change produces positive outcomes with respect to new events comparable to the detected events;
responsive to the tracked interactions producing positive outcomes, identify a second group of candidate vehicles, experiencing events comparable to the detected events; and
deploy the user interface change to the second group of vehicles.

2. The system of claim 1, wherein the detected events include one or more driving behaviors identifiable as anomalous based on comparison to historically observed driving behaviors for a given driver of a vehicle within the plurality.

3. The system of claim 1, wherein the events include one or more driving behaviors predefined as anomalous.

4. The system of claim 1, wherein the tracking includes determination as to whether interactions with the user interface modified by the change occurred in the absence of any event, correlated to a positive outcome.

5. The system of claim 1, wherein the tracking includes a determination as to whether interactions with the user interface modified by the change occurred prior to at least one of the new events, wherein the at least one of the new events was diminished in at least one of duration or aggressiveness, correlated to a positive outcome.

6. The system of claim 1, wherein the tracking includes a determination that average durations of user interactions with the user interface modified by the change have diminished, correlated to a positive outcome.

7. The system of claim 1, wherein the tracking further results in a determination as to whether the change produces a negative outcome, and wherein the one or more processors are configured to offer reversion to a prior user interface responsive to the negative outcome.

8. The system of claim 1, wherein the change is further accommodative of at least one predefined specific user visual preference, so that the change accommodates the at least one specific user visual preferences by reflecting the user preference in a visual adaptation resulting from the change.

* * * * *